(12) United States Patent
Kukkal

(10) Patent No.: US 6,182,073 B1
(45) Date of Patent: Jan. 30, 2001

(54) INTEGRATED INFORMATION BROWSING AND MULTIPLE-PARTICIPANT APPLICATION WITH A PERSISTENCY CONTROL CONFIGURED TO MONITOR AND TO PREVENT ATTEMPTS TO REPLACE DATA WITHIN THE INFORMATION BROWSER

(75) Inventor: Puneet Kukkal, Hillsboro, OR (US)

(73) Assignee: Intel Corporation, Santa Clara, CA (US)

(*) Notice: Under 35 U.S.C. 154(b), the term of this patent shall be extended for 0 days.

(21) Appl. No.: 08/859,055

(22) Filed: May 20, 1997

(51) Int. Cl.[7] .................................................. G06F 17/30
(52) U.S. Cl. .......................... 707/10; 707/526; 709/204; 709/205; 709/206; 345/345
(58) Field of Search ................... 707/526; 709/204–206, 709/207, 237; 370/260; 713/400; 345/345, 330–331

(56) References Cited

U.S. PATENT DOCUMENTS

| | | | |
|---|---|---|---|
| 5,574,934 | * 11/1996 | Mirashrafi et al. | 709/207 |
| 5,581,702 | * 12/1996 | McArdle et al. | 709/204 |
| 5,740,161 | * 4/1998 | Porter et al. | 370/260 |
| 5,794,018 | * 8/1998 | Vrvilo et al. | 713/400 |
| 5,796,393 | * 8/1998 | MacNaughton et al. | 345/329 |
| 5,826,051 | * 10/1998 | Porter et al. | 345/345 |
| 5,828,838 | * 10/1998 | Downs et al. | 709/204 |
| 5,844,553 | * 3/1999 | Hao et al. | 345/29 |
| 5,859,974 | * 1/1999 | McArdle et al. | 709/204 |
| 5,859,979 | 1/1999 | Tung et al. | 709/228 |
| 5,861,883 | * 1/1999 | Cuomo et al. | 345/326 |
| 5,862,325 | 1/1999 | Reed et al. | 709/201 |
| 5,889,764 | * 3/1999 | Needham et al. | 370/263 |
| 5,889,945 | * 3/1999 | Porter et al. | 709/204 |
| 5,907,324 | * 1/1999 | Larson et al. | 345/330 |
| 5,959,622 | * 9/1999 | Greer et al. | 345/326 |
| 6,020,884 | * 2/2000 | MacNaughton et al. | 345/329 |

OTHER PUBLICATIONS

Hiraiwa et al., "Info–Plaza: Social Information Filtering System for the World–Wide Web" IEEE, pp. 10–15, Jun. 1996.

Nee et al., "The Performance of Two–Dimensional Media Scaling for Internet Videoconferencing," IEEE, pp. 223–234, May 19–21, 1997.

* cited by examiner

Primary Examiner—Hosain T. Alam
Assistant Examiner—Ella Colbert
(74) Attorney, Agent, or Firm—Blakely, Sokoloff, Taylor & Zafman LLP

(57) ABSTRACT

In an integrated information browsing and video conferencing interface, a conferencing application is executed and displayed in a first portion of a web browser window.

38 Claims, 9 Drawing Sheets

INTEGRATED INFORMATION BROWSING AND MULTIPLE-PARTICIPANT APPLICATION WITH A PERSISTENCY CONTROL CONFIGURED TO MONITOR AND TO PREVENT ATTEMPTS TO REPLACE DATA WITHIN THE INFORMATION BROWSER

BACKGROUND OF THE INVENTION

1. Field of the Invention

The present invention pertains to information browsing. More particularly, this invention relates to browsing information available on a network (such as the Internet) and executing an application (such as a video conferencing application) in the context of information browsing.

2. Background

As computer technology advances, using a computer system for browsing, in particular browsing information available on a network, has continually increased. A network refers to a collection of two or more computer systems communicatively coupled to one another. A network may also be interconnected to one or more other networks. One particular type of interconnected networks which has become popular recently is the Internet. Typically in a network or a collection of interconnected networks one computer system, referred to as the client system, accesses a second computer system, referred to as the host system, in order to obtain data from the host system.

One use of interconnected networks, particularly the Internet, is referred to as the world wide web or simply "the web". The web refers to the multiple networked computer systems geographically dispersed throughout the world that allows data to be transferred among the computer systems using the HyperText Transport Protocol (HTTP). A number of "web browsers" are commercially available which assist client system users in obtaining and browsing information from host systems (also referred to as web servers). By using such a browser, a client system user is able to retrieve and view documents from a web server locate anywhere in the world. Each web server typically functions independently of the other web servers.

As the popularity of information browsing continues to increase, it is expected that it will become the primary model of user interaction with the computer system, just as the "desktop" model has become for graphical user interfaces. However, one problem with prior art web browsers is that typically only "documents" from a single web server can be loaded at the client system and used by the client system user at a time. Thus, a client system user is typically prohibited from viewing "documents" from one web server while browsing different "documents" from another independent web server in a single instance of a browser. Rather, multiple browser instances must be employed. Similarly, prior art web browsers also do not allow an independent application "unrelated" to the documents of a web server to be co-executed within an instance of a browser. The independent unrelated application must be executed in another window.

Therefore, a need exists for seamless integration of information browsing from multiple independent uncollaborated information sources, including running independent unrelated applications within the context of information browsing.

SUMMARY OF THE INVENTION

An integrated information browsing and video conferencing interface is described herein. A conferencing application is executed and displayed in a first portion of a web browser window.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

The present description includes material protected by copyrights, such as illustrations of graphical user interface images which the assignee of the present invention owns. The assignee hereby reserves its rights, including copyright, in these materials, and each such material should be regarded as bearing the following notice: Copyright Intel Corporation. The copyright owner has no objection to the facsimile reproduction by anyone of the patent document or the patent disclosure, as it appears in the Patent and Trademark Office patent file or records, but otherwise reserves all copyright rights whatsoever.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
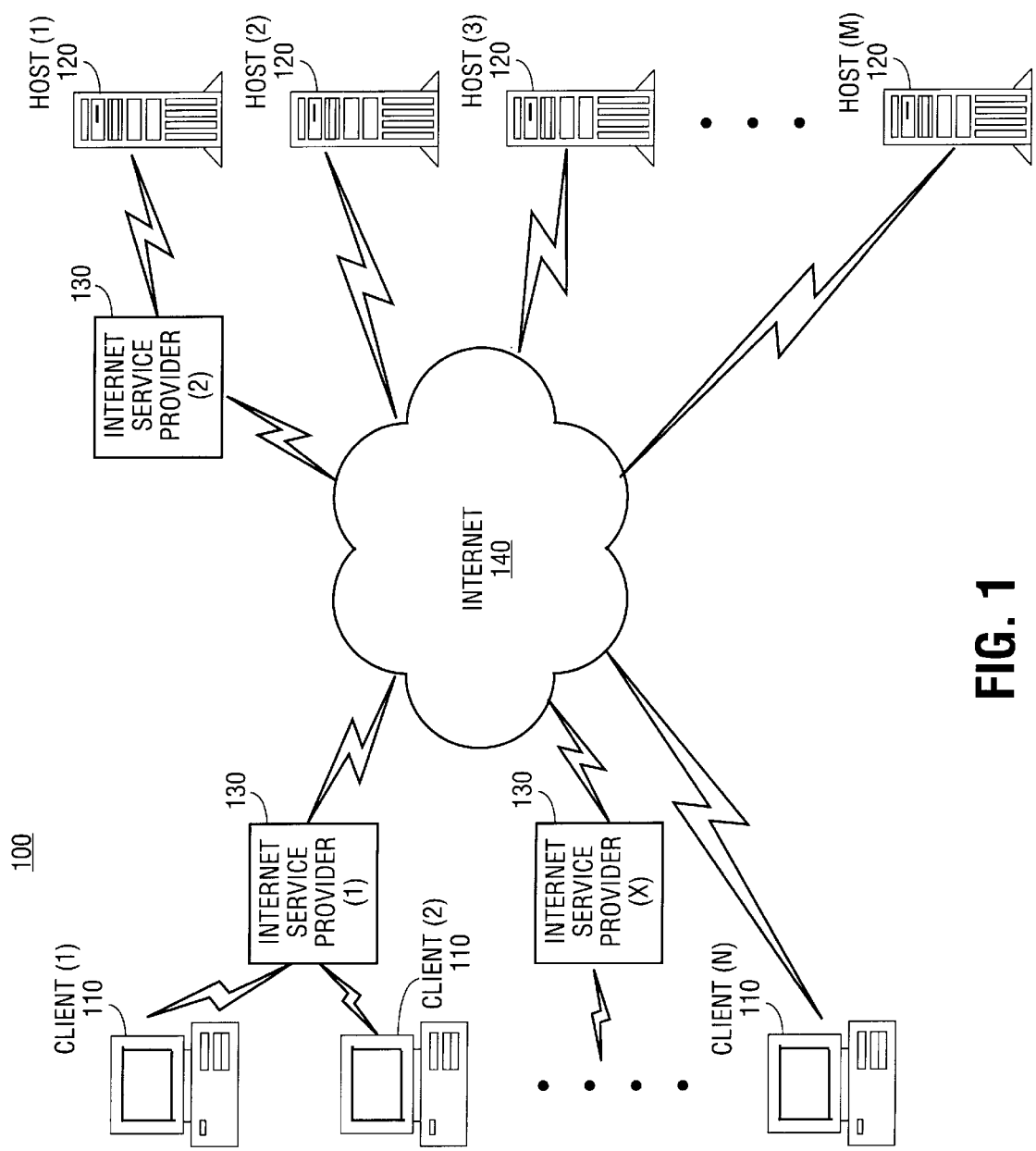
FIG. 1 is a block diagram illustrating a network environment in which the present invention may be practiced.

FIG. 1 is a block diagram illustrating a network environment in which the present invention may be practiced. As illustrated, network environment 100 includes multiple (N) client systems 110 and multiple (M) host systems 120, collectively referred to as networked systems. Network environment 100 also includes multiple (X) internet service providers (ISPs) 130, and the Internet 140.

Each client system 110 can be any of a wide range of "computing" devices which provide a user with the ability to access the Internet 140. A client system 110 can access the Internet 140 either directly or through an ISP 130 as illustrated. Examples of such "computing" devices include conventional desktop computers as well as Internet "appliance" devices, such as a WebTV™ Internet Terminal available from Microsoft Corporation of Redmond, Wash., or WebTV Networks Inc. of Palo Alto, Calif.

Each ISP 130 is typically a computer system having a large amount of storage space (typically on the order of hundreds of gigabytes or terabytes) and multiple communication lines for facilitating access to the Internet 140 by client systems 110.

Each host system 120 is also typically a computer system which can be accessed by client systems 110. According to one embodiment, each host system 120 includes one or more HyperText Markup Language (HTML) compatible web pages which can be accessed via the HyperText Transfer Protocol (HTTP) and displayed by an HTML compatible Internet browser running on a client system 110. In this embodiment, an individual user can access a web page at a host system 120 by entering an identifier, referred to as a Uniform Resource Locator (URL), of the web page. In addition, each host system 120 may also contain one or more data files which can be accessed by client systems 110. These data file(s) may be accessed via HTTP, or alternatively other protocols, such as the file transfer protocol (FTP).

The web pages, also referred to as HTML documents, can be either static or dynamic documents. A static document or static page refers to a web page which does not provide for user interaction with the page. The data of the web page is simply displayed for the user, and does not provide for additional inputs to the page by the user. A dynamic document or dynamic page, also referred to as an Internet application, refers to a web page which is not static and, through various controls and scripts, provides for user interaction with the document. A dynamic document can include controls and scripts which execute various applications at the client system. Thus, a user is often able to input additional data to the page to which the page, based on its programming, responds.

The Internet 140 is a combination of multiple conventional hardware components, including computer systems, routers, repeaters, gateways, and communications links spread throughout the world. These hardware components are organized hierarchically to provide multiple logical levels of networks. The hardware components of Internet 140 interact to route data from one computer system to another. According to one implementation, data is transferred between computer systems using the well-known Transmission Control Protocol/Internet Protocol (TCP/IP) protocol. The data is typically transferred in units referred to as "packets" or "datagrams". Typically, each packet includes data, a source address identifying the system which initiated the packet and a target address identifying the system to which the packet is to be sent. Additional control information, such as a checksum, may also be included in the packet. The number of bytes of data contained within a packet is dependent on the network protocol being used.

The communication links illustrated in FIG. 1 can be any of a wide range of conventional communication media and may be different for different client systems 110, host systems 120, and ISPs 130. For example, a communication link may be a coaxial cable, a fiber-optic cable, or may represent a nonphysical medium transmitting electromagnetic signals in the electromagnetic spectrum, such as infrared or radio frequency signals. Additionally, a communication link may also include any number of conventional routing or repeating devices, such as satellites or electromagnetic signal repeaters.

It is to be appreciated that although client systems 110 and host systems 120 are illustrated as being different machines, a single hardware system may be both a client system and a host system. If the hardware system is initiating an access for information to another system then the hardware system is referred to as a client system. However, if the hardware system is being accessed by another system to obtain information from the hardware system then the hardware system is referred to as a host system.

It is to be appreciated that additional networks may also be included in the network environment 100. For example, multiple client systems 110 may be coupled together in an Ethernet, token ring, or other conventional network and access an ISP 130 through this additional network.

Figure 2:
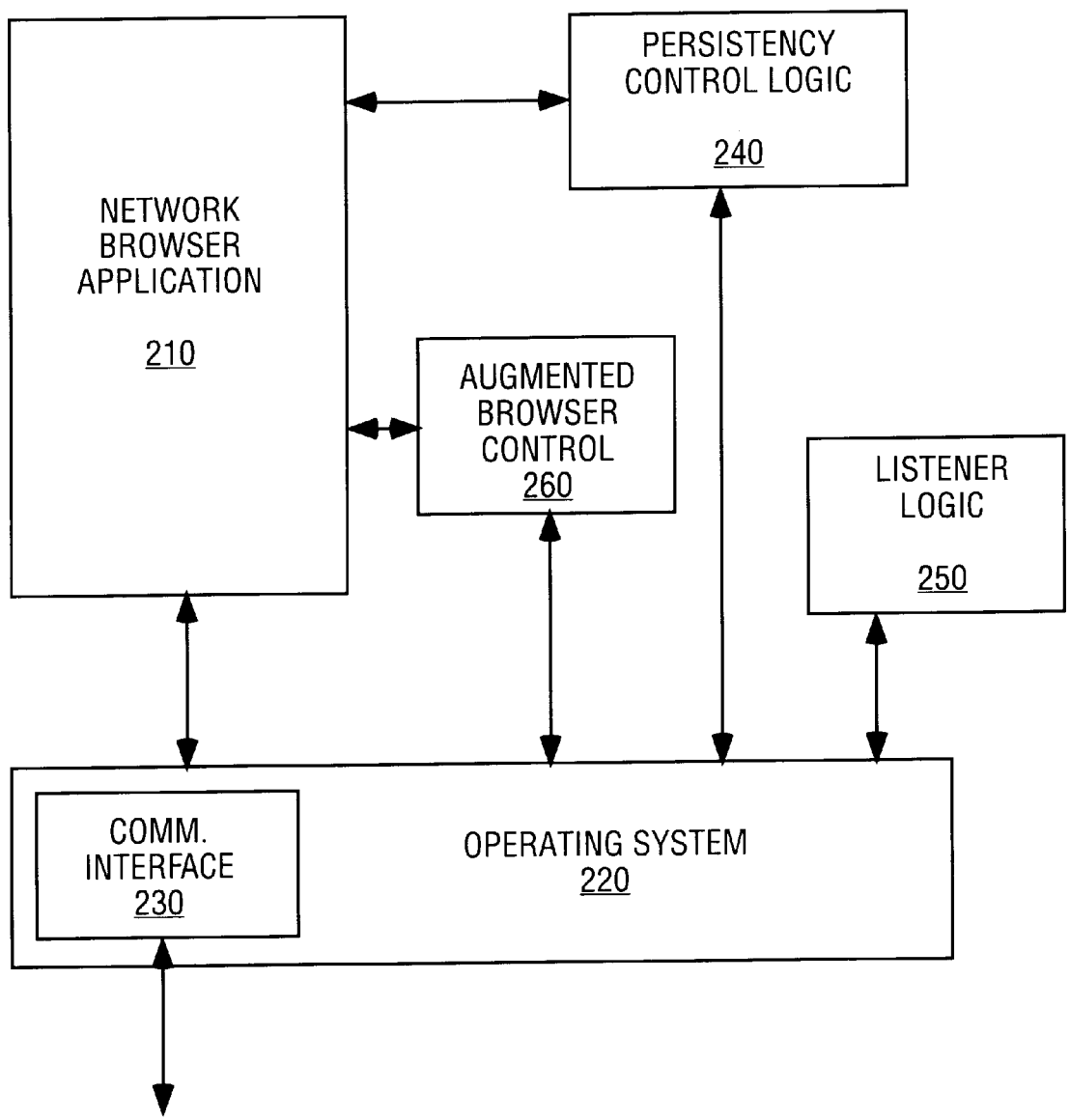
FIG. 2 is a simplified block diagram illustrating a system architecture such as may be used with one embodiment of the present invention.

FIG. 2 is a simplified block diagram illustrating a system architecture such as may be used with one embodiment of the present invention. As shown, system architecture 200 includes a network browser application 210, an operating system 220, a communication interface 230, persistency control logic 240, listener logic 250, and augmented browser control 260. According to one embodiment of the present invention, one or more client systems 110 of FIG. 1 include a system architecture 200 of FIG. 2.

Operating system 220 manages and controls the operation of the client system, including the input and output of data to and from network browser 210 as well as other software applications (not shown). Operating system 220 provides an interface, such as a graphical user interface (GUI), between the user and the software applications being executed on the system. According to one embodiment of the present invention, operating system 220 is the Windows™ 95 operating system, available from Microsoft Corporation of Redmond, Wash. However, it is to be appreciated that the present invention may be used with other conventional operating systems, such as other versions of Microsoft Windows™ (for example, Windows™ 3.0, Windows™ 3.1, or Windows™ NT), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or the UNIX operating system, available from Santa Cruz Operations of Santa Cruz, Calif.

Network browser 210, also referred to as an information browser, provides a user interface, such as a graphical user interface (GUI), which allows an individual to send information to and receive information from another networked system. According to one embodiment of the present invention, network browser 210 is an HTML compatible Internet browser, such as Internet Explorer, available from Microsoft Corporation of Redmond, Wash., Navigator™, available from Netscape Communications Corporation of Mountain View, Calif., or HotJava™, available from Sun Microsystems of Mountain View, Calif. It is to be appreciated, however, that browser 210 can be any of a wide variety of conventional interfaces which allow an individual user to access other networked systems.

Communication interface 230, according to one embodiment, includes a Windows Sockets 2 interface, as defined in the Windows Sockets 2 Service Provider Interface Specification, Revision 2.2.0, dated May 10, 1996, the Windows Sockets 2 Application Programming Interface, Revision 2.2.0, dated May 10, 1996, and the Windows Sockets 2 Protocol-Specific Annex, Revision 2.0.3, dated May 10, 1996. Alternatively, communication interface 230 may include Windows Sockets 1.1 interface, as defined in the Windows Sockets Interface Specification, Version 1.1, dated Jan. 20, 1993. Communication interface 230 controls communication between the network and browser 210, persistency control 240, and augmented browser control 260.

When enabled, persistency control logic 240 registers itself with browser 210 to receive events originated by web browser 210 which include the web page identifiers input to browser 210. Additionally, persistency control logic 240 conditionally prevents browser 210 from replacing the current display with newly identified HTML documents. In one embodiment, persistency control 240 intervenes in the display of newly requested data such that the new data is co-displayed with the previously received data, thereby providing display persistency. Persistency control logic 240, when enabled, monitors the data requests input to network browser 210. In the case of the world wide web, these data requests are web page identifiers, also referred to as URLs. Web page identifiers can be input to browser 210 in any of a wide variety of conventional manners, including a user typing in a specific identifier, hitting a "Back" or "Forward" button, selecting an identifier from a list of "favorites", selecting a link in an HTML document, etc.

According to one embodiment of the present invention, the portion of the received data which persists in the web browser is that data corresponding to a dynamic page, also referred to as an Internet application. All information related to the Internet application, including controls and data such as application-specific executable code, application-specific HTML content, and application-specific scripts are maintained by the client system. Persistency control 240 effectively "locks" this information into the client system, thereby preventing it from being erased when a new web page is loaded. In other words, rather than allowing browser 210 to clear the entire display, the persistency control 240 intervenes and in cooperation with augmented browser control 260 displays the new data in an "unlocked" portion of the browser's display window.

Persistency control logic 240 initiates augmented browser control 260 when persistency control logic 240 is enabled. Augmented browser control 260 retrieves and displays the newly requested web pages at the request of persistency control logic 240. Together, the "locked" and "unlocked" portions allow web pages from two independent non-collaborating web servers to be displayed concurrently. Thus, the web page from a first page source persists and the user is able to continue to interact with the persisting web page even though web pages from different sources are being retrieved and browsed.

It should be noted that the HTML documents displayed by augmented browser control 260 can be located locally as well as remotely. Thus, a particular identifier may indicate to augmented browser control 260 to access an HTML document via Internet 140 of FIG. 1, or alternatively the HTML document may be stored locally at the client system.

Persistency control logic 240 registers itself, upon its creation, with browser 210. More specifically, in embodiments where browser 210 is the Microsoft Internet Explorer, persistency control logic 240 accesses an IConnectionPoint interface of browser 210 via an IServiceProvider interface of browser 210. Persistency control logic 240 then registers with browser 210 using an Advise command, thereby causing browser 210 to notify persistency control logic 240 of all the browser events. Persistency control logic 240 monitors the events received from browser 210, waiting for either a BeforeNavigate or FrameBeforeNavigate event. Both of these events indicate that browser 210 is about to navigate to a new web page. In other words, each of these events indicates a new identifier has been input to browser 210 by the user. One parameter of each of these events is the identifier of the new page to which browser 210 is about to navigate. Thus, persistency control logic 240 is aware of the new page request input to browser 210. An additional parameter for both the BeforeNavigate and FrameBeforeNavigate events is a cancel parameter. The cancel parameter can be set by persistency control logic 240 prior to completing processing of the received event, thereby causing browser 210 to cancel retrieving of the new web page.

Persistency control logic 240 then sends an event indicating the new identifier that has been input by the user. This event is received by scripts executing in the Internet application page. These scripts respond to the received event and direct augmented browser control 260 to navigate to the requested page. Augmented browser control 260 includes logic, analogous to that of browser 210, which allows it to access and retrieve the requested web page. In one implementation, the scripts direct augmented browser control 260 to navigate to the requested page by calling a Navigate command of augmented browser control 260. Upon receipt of the identifier, augmented browser control 260 retrieves and displays the requested web page.

The display of information within the browser window is controlled by both augmented browser control 260 and the Internet application which is "locked". Scripts in the Internet application control the size and display location where the Internet application is displayed to the user. Control logic within augmented browser control 260 controls the size and display location where the web pages being browsed are displayed to the user. In one embodiment, the scripts of the Internet application notify augmented browser control 260 of the size and display location of the Internet application, and augmented browser control 260 simply uses the remaining screen location within the window of browser 210.

In one embodiment of the present invention, persistency control logic 240 also monitors the events received from browser 210 for a Resize event. The Resize event indicates that the window size of browser 210 is being changed. Persistency control logic 240 notifies the scripts of the Internet application of this change, thereby allowing it to adjust the size and display location where the Internet application is displayed to the user. The scripts then notify augmented browser control 260 of the new size and display location of the Internet application, thereby allowing augmented browser control 260 to adjust the size and display location where the web pages being browsed are displayed to the user, based on the new size of the browser 210 window.

According to one embodiment of the present invention, the Internet application which is "locked" by persistency control 240 is a web page invoking a video conferencing application, such as a ProShare® Personal Conferencing application, available from Intel Corporation of Santa Clara, Calif. Other video conferencing applications include, for example, the Intel Video Phone with ProShare® technology, or other Intel Business Video Conferencing with ProShare® technology applications. The ProShare® Personal Conferencing application remains executing and displayed in the context of the browser while at the same time the system user is able to browse different web pages from independent uncollaborated web servers. In another embodiment of the present invention, the Internet application which is "locked" by persistency control 240 is a web page invoking a video application which provides a video stream to the client system, such as NetShow™, available from Microsoft Corporation of Redmond, Wash. This video stream could be, for example, a training video or a demonstration.

Another example of a web page invoking an Internet application that can be "locked" by persistency control 240 is a web page listing application. Such a listing application maintains a record of each web page which has been accessed by a user during the current browsing session. Page identifiers are displayed to the user in any of a variety of manners, such as chronologically or alphabetically. Selection of one of the page identifiers by the user causes that identifier to be input to the browser and thus retrieved again for the user.

It is to be appreciated that web pages invoking other Internet applications can be "locked" by persistency control 240 within the spirit and scope of the present invention. Examples of such Internet applications include chat applications, file transfer applications, flight reservation applications, etc.

In one embodiment, Internet applications are initiated by selection of a particular link on a web page by the user. By way of example, a particular corporation may include a "talk to customer representative" link. Selection of the link by a user causes a ProShare® Personal Conferencing application to execute on the client system and connects to a customer representative of the corporation. In one implementation, the link includes the type of link to establish, the number to call, and the type of conference to establish. The type of link to establish can be an ISDN link or TCP/IP link. The number to call will either be a conventional phone number in the case of an ISDN link or a network address in the case of a TCP/IP link. The type of conference can be an audio/video conference or an audio/video/data conference.

It is to be appreciated that only the application-specific information need be maintained when "locking" a particular web page. That is, if a link is selected which causes execution of a ProShare® Personal Conferencing application, then only the controls and HTML content necessary to continue executing the ProShare® Personal Conferencing application need be "locked". Any additional HTML content (e.g., unrelated descriptions surrounding the selected link) does not need to be maintained. However, HTML content relating to the Internet application are maintained, such as instructions or labels of selectable options.

In one embodiment of the present invention, augmented browser control 260 includes a function for sending and receiving messages to and from the Internet application. In this embodiment, there can be a functional relationship between the "locked" Internet application and the HTML documents being browsed in the augmented browser. In one implementation, selection of a particular link on a web page displayed by the augmented browser control causes a message to be sent to the Internet application for the Internet application to act on. By way of example, selection of a particular option on a training index web page displayed by the augmented browser control can be conveyed to the Internet application which displays the appropriate video to the user via the Internet application. Similarly, in another implementation, selection of a particular option in the Internet application causes a message to be sent to the augmented browser to act on. By way of example, selection of a particular block of video, or after a predetermined period of time after start of a video stream, a message is sent to the augmented browser control to obtain another web page.

According to another embodiment of the present invention, the "locked" application includes a fiction to synchronize the "unlocked" portion of the display with the "unlocked" portion of the display on another system. In one implementation, this is referred to as a view synchronization option. The view synchronization option causes the views of the two or more systems to be synchronized. By way of example, if the Internet application is a web page invoking a ProShare® Personal Conferencing application, then the two or more client/host system users that are engaged in the conference can be synchronized to the same web page using the view synchronization option. The view synchronization option can be provided to the user and selected by the user in any of a wide variety of manners, such as a hot button, menu option, command line input, dialog box, etc. In embodiments which support the view synchronization option, scripts of the "locked" application maintain a copy of the identifier of the most recently requested web page. Thus, upon selection of the view synchronization option by a user, the Internet application, knowing the web page currently being viewed by the user, transfers the identifier of this web page to the other systems involved in the Internet application. In one embodiment, where the Internet application is a web page invoking a ProShare® Personal Conferencing application, the identifier is transferred via the data channel of the conference to all the users participating in the conference. Upon receipt of the identifier, scripts of the Internet application at each of the receiving systems directs the augmented browser control at the system to access and retrieve the identified web page.

In one embodiment of the present invention, persistency control logic 240 is enabled whenever an Internet application is accessed. According to an alternate embodiment, persistency control logic 240 is enabled when a web page is accessed which indicates to enable persistency control 240. In one implementation this indication is a script in the web page which executes persistency control 240 when the web page is accessed. Thus, in this embodiment, web page designers can decide whether to make use of the present invention.

In an alternate embodiment, persistency control logic 240 is automatically enabled at the client system, such as at system reset or when web browser 210 is launched. In one implementation, a specific application can be launched, such as a ProShare® Personal Conferencing application, and be ready to make or receive a video conference call when web browser 210 is launched. Alternatively, a portion of the display can remain blank, waiting for an Internet application to be accessed.

In one embodiment of the present invention an additional monitoring application, listener logic 250, is also executed. In one implementation, listener logic 250 is executed at system reset. In alternate implementations, listener logic 250 is user executed. Listener logic 250 monitors the input signals received by operating system 220. When listener logic 250 monitors an incoming ProShare® Personal Conferencing call, it automatically executes browser 210 and persistency control logic 240, as well as the ProShare® Personal Conferencing application. Thus, listener logic 250 allows a user to make use of the present invention without requiring the user to execute the browser and the ProShare® Personal Conferencing application every time.

Figure 3A:
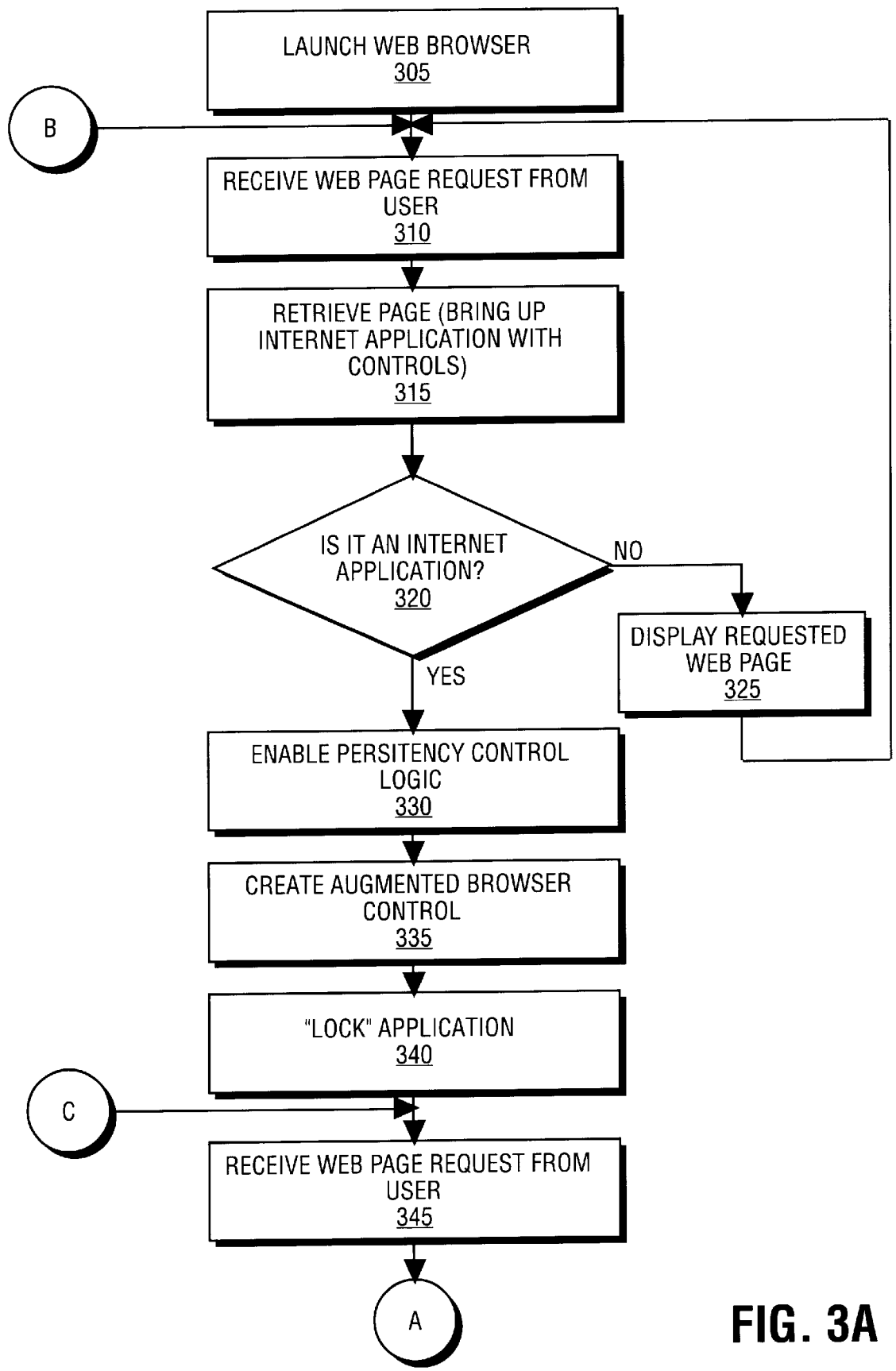
FIGS. 3a and 3b are a flow chart illustrating the steps followed according to one embodiment of the present invention.
Figure 3B:
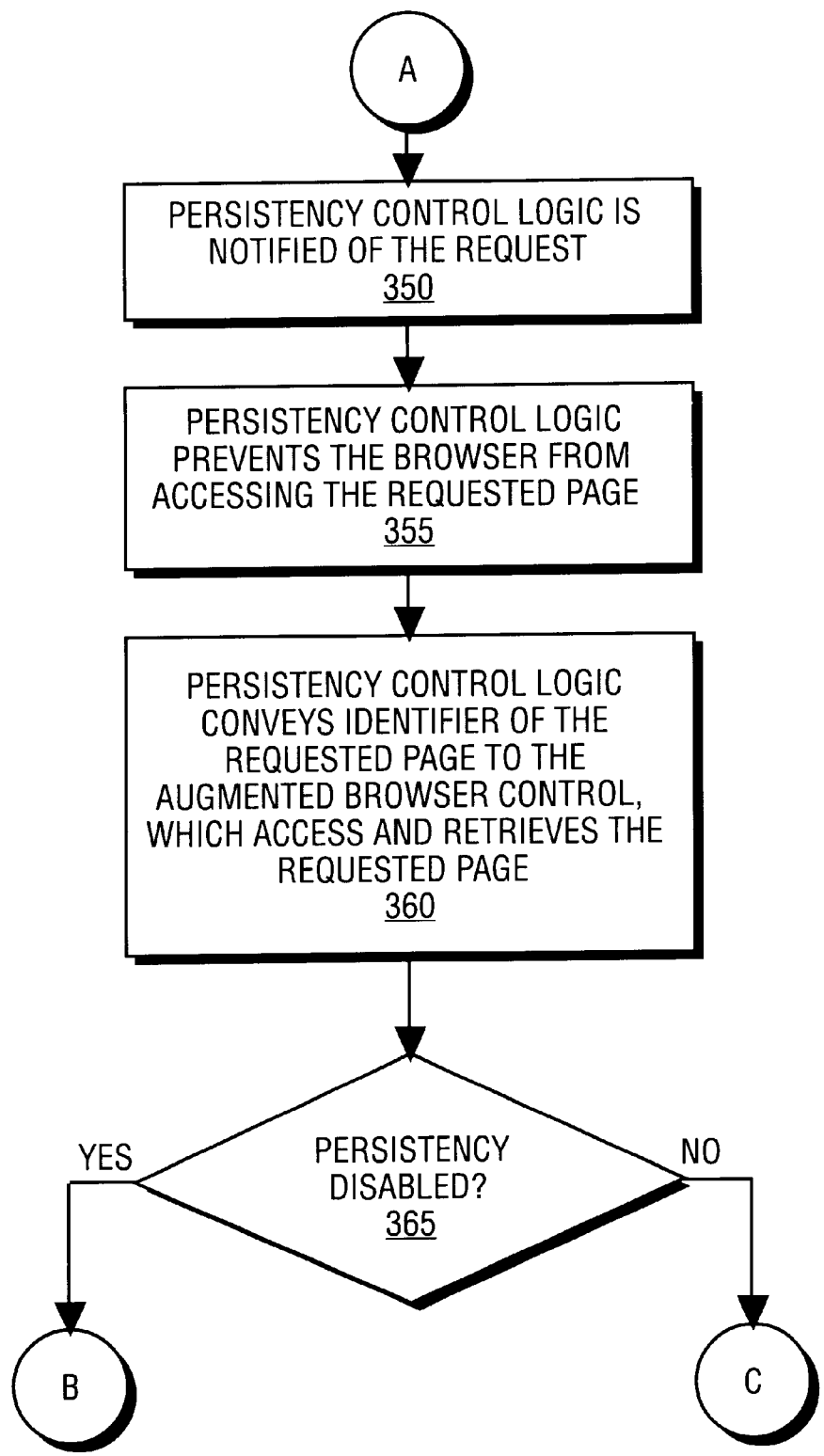

FIGS. 3a and 3b are a flow chart illustrating the steps followed according to one embodiment of the present invention. A web browser 210 is first executed on the client system, step 305, and a web page request is eventually received from a user, step 310. Web browser 210 accesses and retrieves the requested page, step 315, loading in the application controls if it is an Internet application (a dynamic page). If the page is not an Internet application, step 320, then browser 210 displays the requested web page, step 325. This process continues until a requested page is for an Internet application.

However, if the page is an Internet application, step 320, then persistency control logic 240 is enabled, step 330. In the illustrated embodiment, persistency control logic 240 is enabled via a script in the requested web page. As part of being enabled, persistency control logic 240 registers itself with browser 210 to receive web page identifiers when they are input by the user. Upon being enabled, persistency control logic 240 creates the augmented browser control, step 335, which displays the web pages within the browser 210 along with the Internet application. Persistency control logic 240 then "locks" the application, step 340, thereby causing the application to persist even though the pages being browsed and displayed in the augmented browser may change.

Eventually, web browser 210 receives another web page request from the user, step 345. Persistency control 240, having registered with browser 210, is notified of the web page request, step 350. Persistency control logic 240 then prevents browser 210 from accessing and displaying the requested web page, step 355. Persistency control logic 240 then conveys an identifier of the requested page to the augmented browser control, which accesses and retrieves the page, step 360. Thus, the requested page is displayed along with the "locked" application. The "locked" portion continues to be displayed until the persistency is disabled, step 365. In one embodiment, the persistency is disabled by terminating execution of the application which enabled persistency control logic 240.

Figure 4:
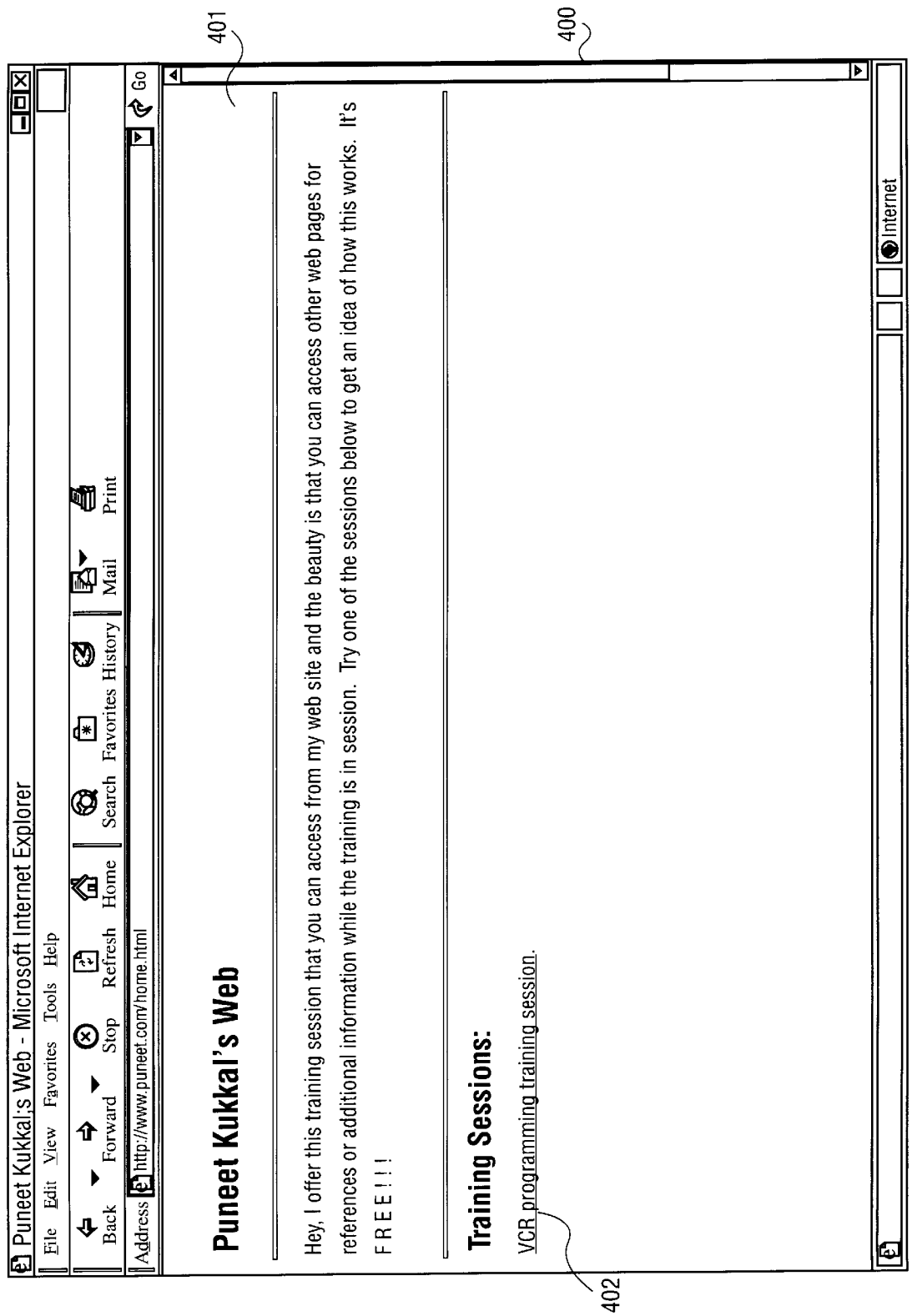
FIGS. 4, 5, 6, and 7 illustrate example displays such as may be provided when using one embodiment of the present invention.
Figure 5:
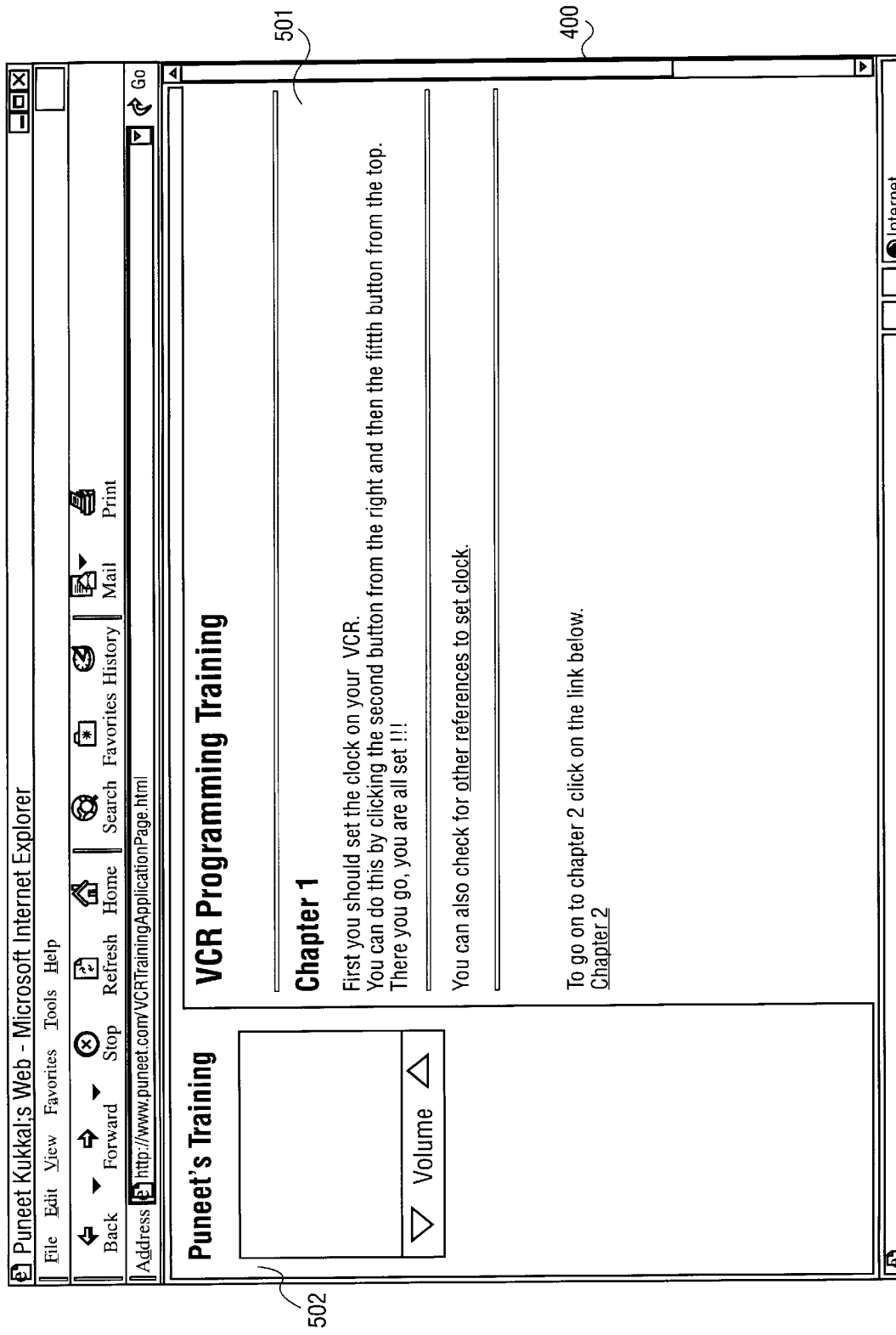
Figure 6:
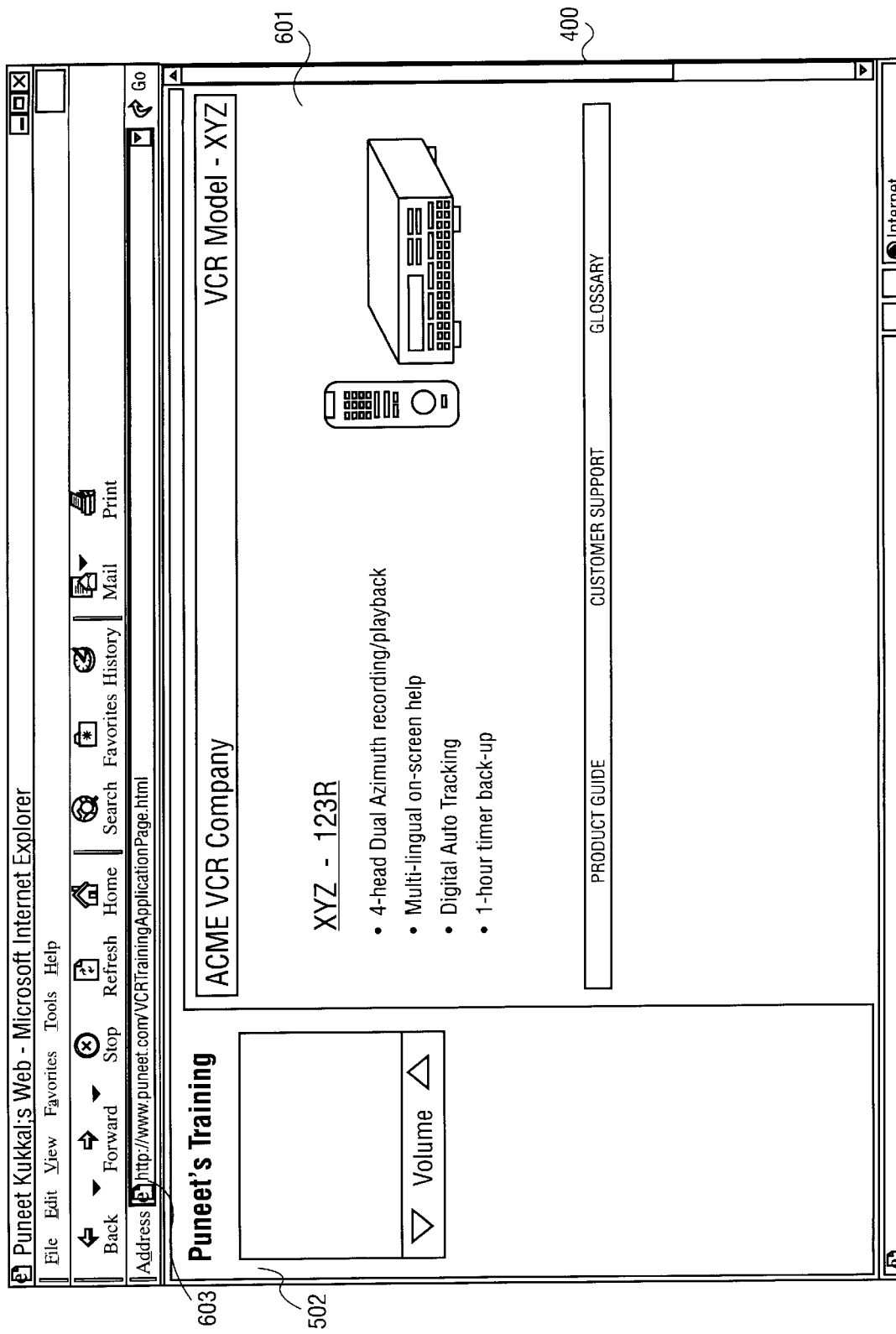

FIGS. 4, 5, and 6 illustrate example displays such as may be provided when using one embodiment of the present invention. FIG. 4 illustrates an initial display of an HTML document 401 which includes link 402 to another web page. HTML document 401 is displayed in a browser window 400. Selection of link 402 by a user accesses a training session for VCR programming and invokes the persistency control logic of the present invention. FIG. 5 illustrates the display after link 402 of FIG. 4 is selected. A new HTML document 501 is displayed, as well as a training video application 502. As illustrated in FIG. 5, both application 502 and HTML document 501 are displayed within browser window 400. Note that application 502 continues to display a training audio/video stream while document 501 is displayed. In an alternate embodiment, rather than retrieving a new HTML document as illustrated in FIG. 5, HTML document 401 is displayed along with application 502 in browser window 400. In this alternate embodiment, an additional link is provided in document 401 which identifies document 501.

FIG. 6 illustrates the display after a new identifier is input to browser window 400. As illustrated in FIG. 6, a new URL 603 has been input to browser window 400. The HTML document 601 identified by URL 603 has been retrieved and is displayed along with application 502 in browser window 400. Again, application 502 continues to display a training audio/video stream while document 601 is displayed and during the transition to document 601 from document 501. Thus, as illustrated in FIGS. 5 and 6, application 502 along with its corresponding control information persists while the HTML documents 501 and 601 are being browsed, with both application 502 and document 501 or 601 appearing to the user in a single browser display window 400. It is to be appreciated that if the Internet application and the HTML documents being browsed are using the same network interface, data for the two will not be received at exactly the same time due to his sharing. However, the two will appear to the user to be received at approximately the same time.

Figure 7:
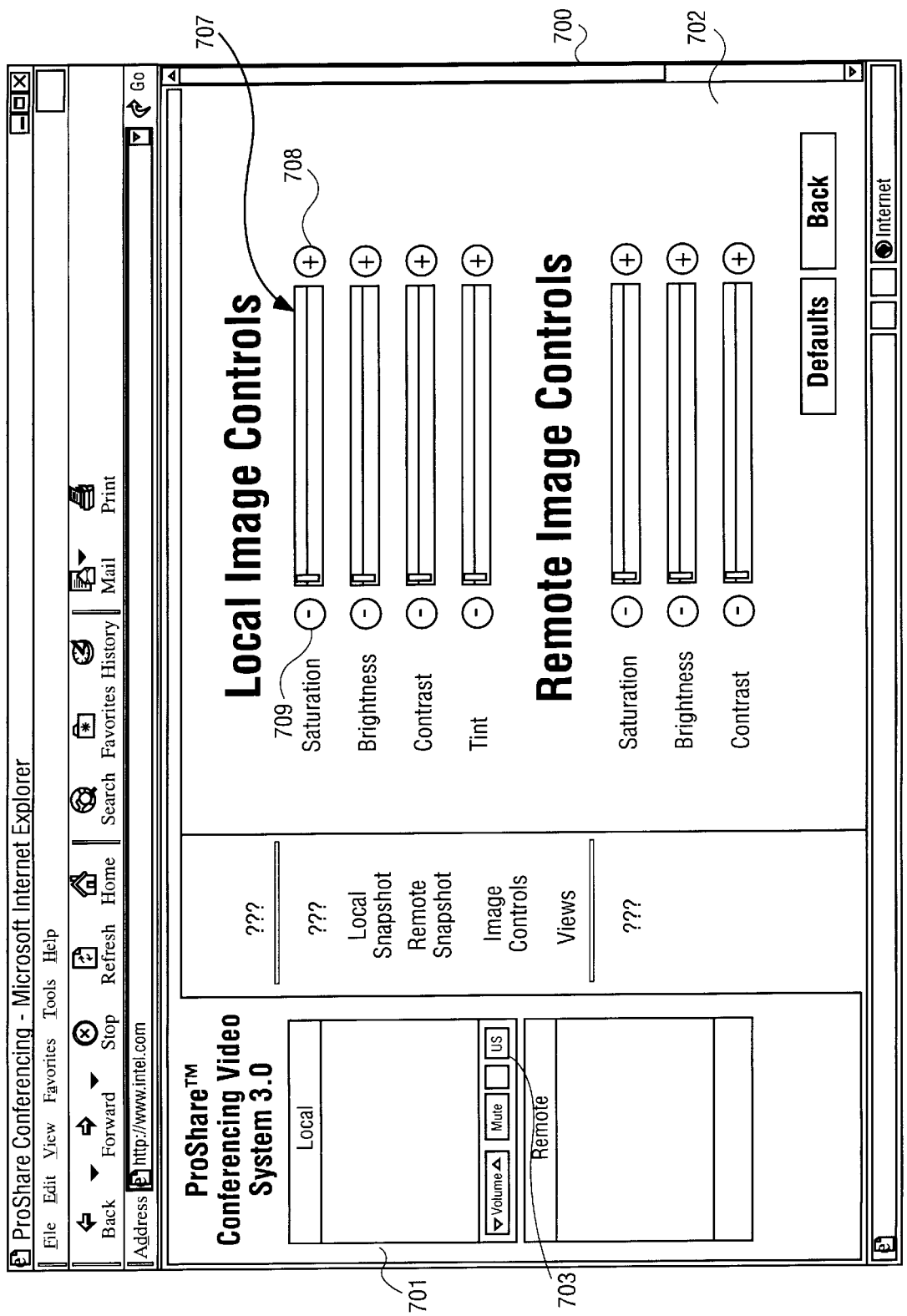

FIG. 7 illustrates another example display such as may be provided according to one embodiment of the present invention. FIG. 7 illustrates the browser window 700 displaying an Internet application 701 and an HTML document 702. Internet application 701 is invoking a ProShare® Personal Conferencing application which includes a view synchronization option 703. Selection of view synchronization option 703 causes the two or more parties involved in the ProShare® Personal Conferencing conference to synchronize to the same web page. In the illustrated embodiment, the URL of the last web page to be requested by a user is transmitted to the other client systems upon selection of the view synchronization option 703 by the user.

FIG. 7 differs from FIGS. 4–6 in that HTML document 702 provides local control information for Internet application 701 rather than a web page which has been retrieved over a network. HTML document 702 is stored locally and retrieved by augmented browser control 260 of FIG. 2 upon request of a user. When a user desires to change the various options for Internet application 701, he or she selects the appropriate option which he or she wants to change. Internet application 701 includes scripts which, upon selection of an option by the user, are executed and pass the identifier of a corresponding local HTML document to augmented browser control 260, which accesses and retrieves the local document.

In the illustrated embodiment, Internet application 701 is controlling a ProShare® Personal Conferencing application, and document 702 provides saturation, brightness, contrast, and tint controls for the local image of the ProShare® Personal Conferencing application, and saturation, brightness, and contrast controls for the remote image of the ProShare® Personal Conferencing application. These controls are accessible to software and can be freely adjusted. The accessing and setting of these controls are well-known to those skilled in the art and thus will not be discussed further except as it pertains to the present invention.

HTML document 702 as illustrated includes a sliding scale 707 which provides an indication for the current setting of each of the image controls. Furthermore, the setting for each of the image controls can be increased or decreased by user selection of either the increment 708 or decrement 709 controls. Thus, a more user-friendly environment is maintained by providing the application 701 controls to the user in the screen location where the user is used to interacting, that is, within the browser 700.

It is to be appreciated that although brightness, saturation, contrast, and tint controls are illustrated in FIG. 7, any of the user-modifiable controls associated with application 701 can be provided to the user via an HTML document analogous to document 702. Examples of these controls include panning, tilting, zooming in and out, sharpness, display size, volume control, mute options, audio selection (e.g., speaker or headphones), balance, snapshot control, dialing lists, etc.

In FIGS. 5, 6, and 7, the Internet application 502 of FIGS. 5 and 6 and 701 of FIG. 7 is illustrated as being displayed on the left side of the browser window. However, it is to be appreciated that in alternate embodiments this location can be different, such as at the top, right side, or bottom of browser window 400 or 700.

Figure 8:
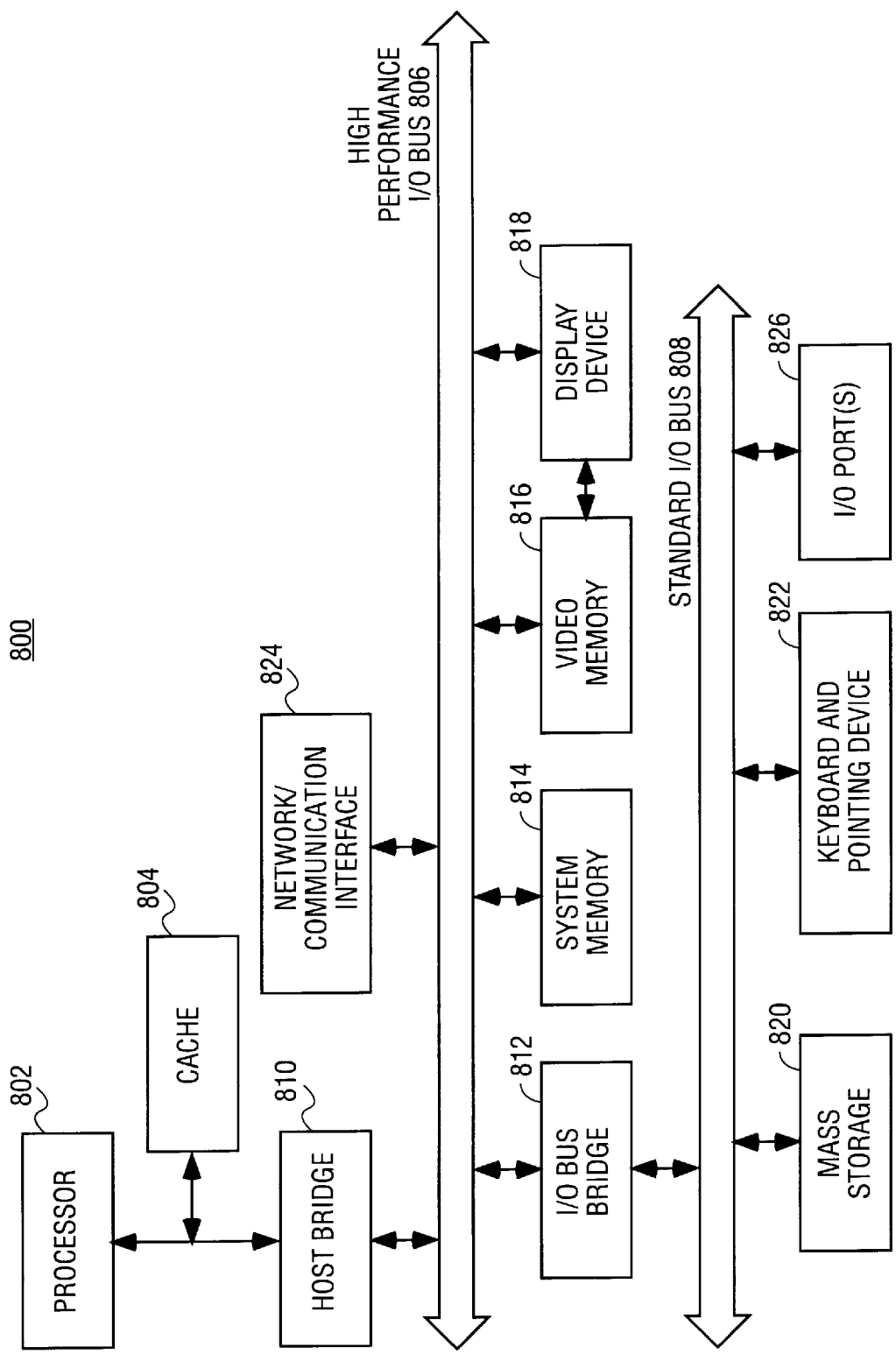
FIG. 8 illustrates one embodiment of a hardware system suitable for use with the present invention.

FIG. 8 illustrates one embodiment of a hardware system suitable for use with the present invention. In one embodiment, each client system 110 of FIG. 1 is a hardware system 800 of FIG. 8. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 is mass storage 820, keyboard and pointing device 822, and I/O ports 826. Collectively, these elements are intended to represent a broad category of hardware systems, including but not limited to general purpose computer systems based on the Pentium® processor, Pentium® Pro processor, or Pentium® II processor manufactured by Intel Corporation of Santa Clara, Calif.

These elements 802–826 perform their conventional functions known in the art. In particular, network/communication interface 824 is used to provide communication between system 800 and any of a wide range of conventional networks, such as an Ethernet, token ring, the Internet, etc. It is to be appreciated that the circuitry of interface 824 is dependent on the type of network the system 800 is being coupled to.

Mass storage 820 is used to provide permanent storage for the data and programming instructions to perform the above described functions implemented in the system controller, whereas system memory 814 is used to provide temporary storage for the data and programming instructions when executed by processor 802.

I/O ports 826 are one or more serial and/or parallel communication ports used to provide communication between additional peripheral devices which may be coupled to hardware system 800.

It is to be appreciated that various components of hardware system 800 may be re-arranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, mass storage 820, keyboard and pointing device 822, and/or display device 818 and video memory 816 may not be included in system 800. Additionally, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the elements of the present invention are implemented as a series of software routines run by hardware system 800 of FIG. 8. These software routines comprise a plurality or series of instructions to be executed by a processor in a hardware system, such as processor 802 of FIG. 8. Initially, the series of instructions are stored on a storage device, such as mass storage 820. It is to be appreciated that the series of instructions can be stored on any conventional storage medium, such as a diskette, CD-ROM, magnetic tape, DVD[1], laser disk, ROM, etc. It is also to be appreciated that the series of instructions need not be stored locally, and could be received from a remote storage device, such as a server on a network, via network/communication interface 824.

[1]DVD is currently used as an acronym for digital video disk. However, it appears that the usage is changing to digital versatile disk to reflect the ability of DVD technology to be used for data other than video.

The instructions are copied from the storage device, such as mass storage 820, into memory 814 and then accessed and executed by processor 802. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In the discussions above, reference is made to transferring data via HTTP over the Internet. However, in alternate embodiments different protocols can be used.

In some of the discussions above reference is made to an Internet application being "locked" by the present invention. However, in an alternate embodiment a static document is "locked" rather than a dynamic document. Thus, in this alternate embodiment, one document, such as the results of a web search or an index, remains on the display while the user is able to continue to browse to additional documents.

Also in the discussions above reference is made to one application being "locked" by the present invention. However, in alternate embodiments additional applications are "locked". By way of example, persistency control logic 240 of FIG. 2 may control the "locking" of two different applications and still allow a user to browse the web in a third location of the display.

Thus, the present invention provides for an integrated browser and video conferencing application. The video conferencing application is advantageously displayed to the user in the same window in which the user is able to browse other web pages. Furthermore, video conferencing control options are advantageously displayed to the user as web pages, allowing the user to modify the control options through the web pages.

Thus, an integrated information browsing and video conferencing interface has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:

executing a multple-participant application;

registering a persistency control with an information browser, said persistency control configured to monitor and selectively prevent attempts to replace data within the information browser;

embedding an output of the multiple-participant application in a first portion of an information browser window, wherein said embedding persists per the persistency control and is non-responsive to attempts to replace data within the information browser until such persistency is disabled; and providing a second portion of the browser information window responsive to attempts to replace data within the information browser.

2. The method of claim 1, further comprising:

wherein the first portion is a first browser frame defined within the information browser window, and the second portion is a second browser frame defined within the information browser window.

3. The method of claim 1, further comprising:

providing a view synchronization option; and sending an identifier of a most recently received web page to another multiple-participant application via a network response to user selection of the view synchronization option.

4. The method of claim 1, wherein executing the multiple-participant application comprises automatically executing the multiple-participant application upon receipt of an incoming application-execution signal for the multiple-participant application.

5. The method of claim 1, wherein the multiple-participant application comprises an audiovisual conferencing application.

6. An article of manufacture comprising a computer-readable medium having stored thereon a plurality of instructions, which when executed by a processor, are capable of directing the processor to execute a multiple-participant application, register a persistency control, with a network browser, said persistency control configured to monitor and selectively prevent attempts to replace data within the network browser, to persistently embed an output of the multiple-participant application in a first portion of a network browser window per said persistency control so that such embedding is non-responsive to attempts to replace data within the information browser until such persistency is disabled, and to provide a second portion of the network browser window responsive to attempts to replace data within the information browser.

7. The computer-readable medium of claim 6, wherein the plurality of instructions are further to implement a function to embed the first portion in a first network browser frame defined within the network browser window, and to display the second portion in a second network browser frame defined within the network browser window.

8. The computer-readable medium of claim 6, wherein the plurality of instructions are further to implement a function to provide a view synchronization option, and to send an identifier of a most recently received web page to a host system via a network response to user selection of the view synchronization option.

9. The computer-readable medium of claim 6, wherein the plurality of instructions for implementing a function to execute the multiple-participant application comprise instructions for implementing a function to automatically execute the multiple-participant application upon receipt of an incoming application execution signal for the multiple-participant application.

10. The computer-readable medium of claim 6, wherein the plurality of instructions for implementing a function to execute the multiple-participant application comprise instructions for implementing a function to execute an audiovisual conferencing application.

11. An apparatus comprising:

control logic to execute a multiple-participant application;

persistency control logic to selectively persist data within a first portion of an information browser window of an information browser by preventing replacement of such persistent data by the information browser, the information browser window having a second portion responsive to attempts to replace data within the information browser window;

embedding logic, communicatively coupled with said persistency control logic, to persistently embed an output of the multiple-participant application in a first portion of an information browser window non-responsive to attempts to replace information within the information browser until such persistency is disabled.

12. The apparatus of claim 11, wherein the persistency control logic is further operative to embed the first portion in a first frame defined within the information browser window, and to display the second portion in a second frame defined within the information browser window.

13. The apparatus of claim 11, wherein the persistency control logic is further operative to send an identifier of a most recently received web page to a host system via a network in response to user selection of a view synchronization option.

14. The apparatus of claim 11, wherein the control logic is further operative to automatically execute the multiple-participant application upon receipt of an incoming application execution signal for the multiple-participant application.

15. The apparatus of claim 11, wherein the multiple-participant application comprises an audiovisual conferencing application.

16. A method, comprising:

executing an information browser having a persistency control configured to monitor and selectively prevent attempts to replace data within the information browser; and embedding an output from a first application program in a first portion of an information browser window;

wherein said embedding persists per the persistency control and is non-responsive to attempts to replace data within the information browser until such persistency is disabled, and wherein the information browser window has a second portion responsive to attempts to replace data within the information browser.

17. The method of claim 16, further comprising:

wherein the first portion is a first frame defined within the information browser window, and the second portion is a second frame defined within the information browser window.

18. The method of claim 16, further comprising:

providing a synchronization option; and sending an identifier of a most recently received web page, in response to selection of the synchronization option, to a second application program in communication with the first application program over a network.

19. The method of claim 16, wherein the first application program is a conferencing application, and wherein executing the conferencing application comprises automatically executing the conferencing application upon receipt of an incoming conferencing call.

20. The method of claim 16, wherein the first application program comprises an audiovisual conferencing application.

21. A medium having encoded thereon instructions capable of directing a processor to:
execute an information browser having a persistency control configured to monitor and selectively prevent attempts to replace data within the information browser; and
embed output from a first application program in a first portion of an information browser window;
wherein said embedding is persistent so as to prevent replacement of said output until such persistency is disabled by the persistency control.

22. The medium of claim 21, said instructions further including instructions to direct the processor to:
present control information for the first application program in a second portion of the information browser window;
embed the first portion in a first frame defined within the information browser window; and
embed the second portion in a second frame defined within the information browser window.

23. The medium of claim 21, said instructions further including instructions to direct the processor to:
provide a synchronization option; and
send an identifier of a most recently received web page, in response to selection of the synchronization option, to a second application program in communication with the first application program over a network.

24. The medium of claim 21, wherein the first application program is a conferencing application, and said instructions further include instructions to direct the processor to:
automatically execute said conferencing application upon receipt of an incoming conferencing call.

25. The medium of claim 21, wherein the application program comprises an audiovisual conferencing application.

26. A system, comprising:
means for executing a first user-perceptible application;
persisting means for monitoring and selectively preventing attempts to replace data within an information browser such that the information browser has contemporaneous persistent and non-persistent data; and
means for embedding an output of the first user-perceptible application in a first portion of an information browser window;
wherein said embedding persists as controlled by said persisting means so as to prevent replacement of said output until such persistency is disabled.

27. The system of claim 26, further comprising:
means for presenting the output of the first user-perceptible application in a first frame defined within the information browser window.

28. The system of claim 26, further comprising:
means for providing a perception synchronization option; and
means for sending an identifier of a most recently received web page, in response to selection of the perception synchronization option, to a second user-perceptible application in communication with the first user-perceptible application over a network.

29. The system of claim 26, wherein the user-perceptible application is a conferencing application, the system further comprising:
means for automatically executing the conferencing application upon receipt of an incoming conferencing call.

30. The system of claim 29, wherein the first user-perceptible application comprises an audiovisual conferencing application.

31. A method comprising:
providing an information browser having a persistency control configured to monitor and selectively prevent attempts to replace data within the information browser so that the information browser may have contemporaneous persistent and non-persistent data;
accessing a first host system on a network;
receiving first user-perceptible data from said accessing;
displaying said first user-perceptible data in a first portion of an information browser window, wherein said displaying persists in accordance with the persistency control and is non-responsive to attempts to replace data within the information browser until such persistency is disabled;
accessing a second host system on the network;
receiving second user-perceptible data from said accessing; and
non-persistently displaying said second user-perceptible data in a second portion of the information browser window.

32. The method of claim 31, further comprising:
executing an application program which produces said second user-perceptible data.

33. The method of claim 32, wherein said application program comprises an audiovisual conferencing application.

34. The method of claim 32, further comprising:
receiving a first request identifying the first host system.

35. The method of claim 34, further comprising:
wherein the first request comprises selecting a user-selectable region of the information browser corresponding to the first host system.

36. The method of claim 34, further comprising:
executing the information browser on a host system;
receiving a second request identifying the host system; and
accessing the host system and receiving an executable program responsive thereto;
wherein executing the executable program generates said second user-perceptible data.

37. The method of claim 31, further comprising:
wherein said first user-perceptible data comprises web page data.

38. The method of claim 31, further comprising:
defining plural browser frames within the information browser window;
wherein said first portion of the information browser window is within a first frame of said plural frames, and second portion of the information browser window is within a second frame of said plural frames.

* * * * *

UNITED STATES PATENT AND TRADEMARK OFFICE
CERTIFICATE OF CORRECTION

| | |
|---|---|
| PATENT NO. | : 6,182,073 B1 |
| DATED | : January 30, 2001 |
| INVENTOR(S) | : Kukkal |

It is certified that error appears in the above-identified patent and that said Letters Patent is hereby corrected as shown below:

<u>Column 8,</u>
Line 17, delete "fiction" replace with -- function --.

Signed and Sealed this

Ninth Day of April, 2002

Attest:

JAMES E. ROGAN
*Director of the United States Patent and Trademark Office*

*Attesting Officer*